July 28, 1936. C. O. COZZENS 2,049,107
OPHTHALMIC MOUNTING
Filed Feb. 11, 1933
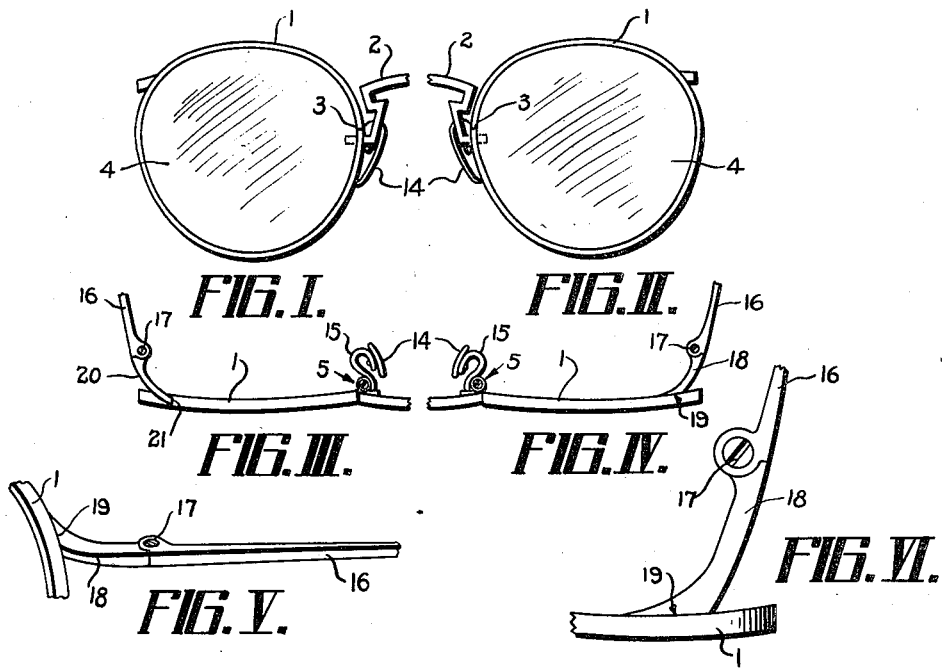
INVENTOR
CHARLES O. COZZENS
BY
Harry H. Styll
ATTORNEY Patented July 28, 1936

2,049,107

UNITED STATES PATENT OFFICE 2,049,107

OPHTHALMIC MOUNTING

Charles O. Cozzens, Southbridge, Mass., assignor to American Optical Company, Southbridge, Mass., a voluntary association of Massachusetts Application February 11, 1933, Serial No. 656,298

2 Claims. (Cl. 88—53)

This invention relates to improvements in ophthalmic mountings and to an improved process of fitting the same to the wearer.

One of the principal objects of the invention is to provide an improved ophthalmic mounting and process whereby said mounting may be quickly and easily adjusted to the facial requirements of different individuals.

Another object of the invention is to provide an ophthalmic mounting having means whereby the temples or sides thereof may be adjusted in or out or up or down as desired.

Another object is to provide means whereby the narrowing effect of connecting the temples high up adjacent the top of the lenses may be adjustably compensated for thereby reducing the number of sizes of mountings necessary to be carried in stock by the dealer.

Another object is to provide a relatively resilient support for the temples or sides of an ophthalmic mounting.

Another object is to provide an ophthalmic mounting having its various elements including the bridge, lenses, nose rests and temples adjustable independently of each other to the requirements of different individuals.

Another object is to provide simple, inexpensive and neat appearing means of accomplishing all of the objects and advantages of the invention.

Other objects and advantages of the invention will become apparent from the following description taken in connection with the accompanying drawing and it will be apparent that many changes in the details of construction and arrangement of parts may be made without departing from the spirit of the invention as expressed in the accompanying claims. I, therefore, do not wish to be limited to the exact details shown and described as the preferred forms only have been shown by way of illustration.

Referring to the drawing:

Fig. I is a fragmentary front elevation of an ophthalmic mounting embodying one form of the invention;

Fig. II is a view similar to Fig. I showing a modified form of invention;

Fig. III is a plan view of Fig. I;

Fig. IV is a plan view of Fig. II;

Fig. V is a fragmentary perspective view of the temple support shown in Fig. IV;

Fig. VI is an enlarged plan view of the temple support shown in Fig. V.

It has been usual, in the past, in ophthalmic mountings to provide means whereby the lenses, bridge and nose guards may be adjusted to the requirements of different individuals. These various adjustments proved very satisfactory but in many instances after such parts had been adjusted it was found that the temples did not properly clear the sides of the wearer's head and during the use of the mounting the said temples would cut in the flesh and cause much pain and discomfort. This condition was particularly true in those cases where the temples were connected up high adjacent the top of the lenses as in the case of the popular so-called high endpiece mountings of the day wherein the distance between the temples was much narrower than in cases where the temples were connected adjacent the horizontal center line of the lenses because above the center line the edges of the lenses retreat towards the nose. This narrowing of the distance between the temples made it necessary to stock a greater number of sizes of mountings than was usual in the past. It was also necessary in the past in order to compensate for variations in the length of temples to carry a large stock of different size temples.

Due to the general structure of mountings of the above character it was very troublesome and difficult to select the proper mounting and to adjust the same to the facial requirements of the wearer. The adjustments did not only require the skill of a specially trained and experienced operator but also required much time and a wide variety of sizes to insure that the lenses would be positioned in accurate prescriptive relation with the eyes and to insure that the said lenses would be permanently and comfortably supported in said relation.

It, therefore, is a principal object of this invention to provide a single mounting having means incorporated therein whereby the mounting may be quickly and comfortably adjusted to the facial requirements of different individuals, particularly having temple connecting means which may adjustably compensate for the variation in widths of heads and lengths of temples, that will reduce the number of stock sizes, and that may be quickly and easily adjusted by relatively untrained operators.

Referring more particularly to the drawing wherein like characters of reference designate like parts throughout the several views, the device embodying the invention, as shown in Figures I and II, comprises a pair of lens holding members which in this instance are in the form of lens rims 1 connected by a bridge member 2 and having a split portion 3 adjacent their nasal sides to permit the insertion or removal of lenses 4. The split portion 3 is provided with a telescoping tube connection 5 formed of separate portions 6 and 7 secured to each of the split ends of the rim and held in telescoped relation with each other by a screw 8. The screw 8 is threaded into the threaded bore 9 of the portion 7 and the head 10 of said screw is adapted to engage with the portion 6 and urge said portion toward the portion 7. The portion 6 and the end of the rim to which it is attached is slotted at 11 to form front and rear bearing points 12 and 13. The object of this arrangement is to provide means when the screw 8 is tightened whereby the front bearing point 12 of the rim may be tightly engaged with the opposite end of the rim.

The bridge member 2 is provided with nose pads or guards 14 which are adjustably supported by the guard arms 15. The said pads or guards may be loosely or rigidly attached to said arms.

The mounting is held on the face by the temples or sides 16 which, as shown in Figures II, IV, V, and VI, are pivotally attached at 17 to an adjustable support 18. The support 18 is attached at 19 to the rear face of the rim 1 and extends rearwardly and outwardly from said rim. The support 18 is adjustable in and out or up and down as desired so that a single mounting may be quickly and easily fitted to the requirements of different individuals. The support 18 as shown in Fig. II is normally located above the useful field of side vision, and slight variations in the height of temple at this location may be quickly acquired by the up and down adjustment.

The temple support 20 shown in Figures I and III is similar to 18 except that it is attached at 21 to the peripheral face of the rim 1 and extends rearwardly and outwardly from said rim. Attention is directed to the fact that the spaced tongues may be formed on the temple supports instead of the temple if desired. The temple supports and temple are, as shown in Figure V, of substantially the same width and are shaped to blend with each other.

The various temple supports 18 and 20 may be formed relatively rigid, ductile or resilient as desired depending upon the nature of the mounting or may each be composed of sections or portions having one or more of the above characteristics. These results may be accomplished by the proper selection and combination of materials or by the proper treatment of said materials. It is to be understood that although the said supports are shown at a high position on the mountings, they may be placed at the horizontal centerline of said mountings if desired.

The bridge member 2 may be formed of any desired material and may be rigid, ductile or resilient as desired and may be used with any desired type of mounting.

Ophthalmic mountings prior to their use must be properly adjusted to the facial requirements of the individual to accurately position the lenses in desired prescriptive relation with the eyes and to comfortably fit the mounting to the face so that the said lenses will be permanently supported in said relation.

In applicant's device special means has been provided whereby each of the elements of the mounting may be adjusted independently of each other and to the requirements of different individuals.

The procedure of fitting the mounting to the wearer is as follows:

The lenses having the required prescriptive characteristics are first properly fitted and mounted in the lens holding means and the distance between the optical centers thereof are adjusted to that of the distance between the centers of the pupils of the wearer's eyes by bending the depending side portions of the bridge member 2, see Figures I and II. The mounting is then placed on the face and the nose rests or guards are adjusted to fit the nose and simultaneously adjusted up or down as required by bending the portions 15 to raise or lower the optical centers of the lenses so that the said centers may be placed in line with straight ahead vision of the eyes. The arch portion 2 of the bridge is then adjusted to clear the nose by bending the said arch portion in or out as required. The temple supports 18 or 20 as the case may be are then adjusted up, down, in or out, as required to clear the head and to obtain the desired height of temple. The adjustment of each part is made independently of the other and without danger of altering and requiring readjustment of the previously adjusted parts.

From the foregoing description it will be seen that I have provided simple, efficient and economical means whereby a single mounting of the above nature may be quickly and easily adjusted to the various requirements of different individuals.

Having described my invention I claim:

1. In a device of the character described, in combination with a temple and lens holding means having a portion shaped to fit the contour of the shape of the edge of the lens, a relatively long and slender arm secured to the shaped portion of the lens holding means at a point located between the vertical center line of said lens holding means and the outer temporal edge thereof, and having an intermediate main adjustable body portion which is relatively straight when viewed from the side substantially up to its point of attachment and having a tapered portion with a reduced end which is turned upwardly to follow the rear of that portion of the lens holding means which is shaped to fit the contour of the edge of the lens and to fit and blend with said portion on the eye side thereof, said arm being secured to said shaped portion throughout the length of a longitudinal edge of its upwardly turned reduced portion with the main body portion thereof extending rearwardly, outwardly and downwardly relative to the point of attachment and terminating in a temple hinge connection.

2. In a device of the character described, in combination with lens holding means having a portion shaped to the adjacent peripheral shape of the lens, a relatively long and slender arm having substantially the same cross sectional shape and size throughout the major portion of its length and having a temple hinge connection adjacent one end thereof and a tapered portion terminating in a reduced portion adjacent its opposite end, said tapered portion being turned upwardly and being formed with a face on a longitudinal side of its upturned reduced portion shaped to fit and form an increased contacting and attaching surface with that portion of the lens holding means shaped to the adjacent peripheral shape of the lens, and means for securing said face to said lens holding means with the said tapered end turned upwardly and with its reduced portion tapering towards the lens holding means on the rear thereof, that portion of said arm having substantially the same cross sectional shape and size being pliable to permit of a wide adjustment of the position of said temple connection and being substantially straight when viewed from the side and extending outwardly, downwardly, and rearwardly of the lens holding means, said tapered portion being substantially invisible when the mounting is viewed from the front.

CHARLES O. COZZENS.